Jan. 1, 1963     A. C. PECKHAM     3,070,919
DECORATIVE BELL ATTACHMENT FOR VEHICLES
Filed Dec. 4, 1959
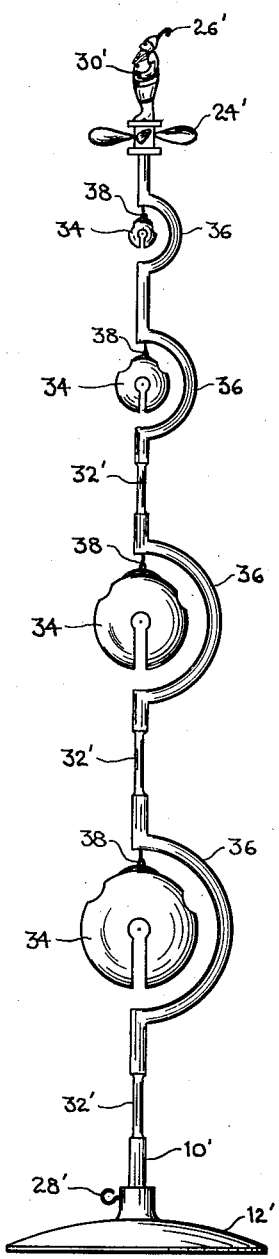
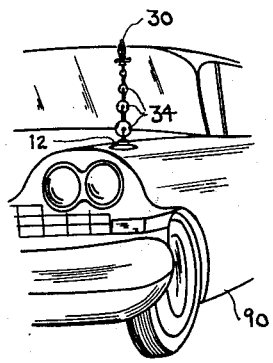
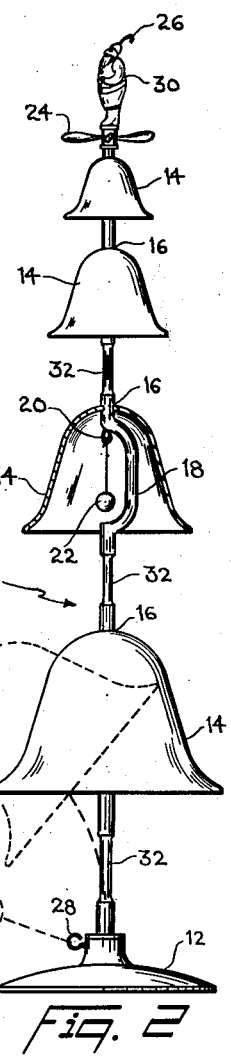
INVENTOR.
ARTHUR C. PECKHAM
BY

United States Patent Office 3,070,919
Patented Jan. 1, 1963

3,070,919
DECORATIVE BELL ATTACHMENT FOR VEHICLES
Arthur Charles Peckham, 304 Trust Co. Bldg., Watertown, N.Y.
Filed Dec. 4, 1959, Ser. No. 857,369
4 Claims. (Cl. 46—53)

This invention relates generally to attachments for vehicles, and has particular reference to a novel decorative bell attachment for use on automotive vehicles during the Christmas season or on other festive occasions.

Prior to the advent of the automobile, horse drawn sleighs were usually equipped with strings of bells which gave forth pleasant musical sounds that were particularly enjoyable at Christmas time. The present invention contemplates and has as its primary objective the provision of a bell attachment for modern day vehicles that is capable of producing the same enjoyable effect and, at the same time, is decorative in appearance. In this connection, the applicant is aware of the fact that bells have heretofore been used on commercial vehicles and that bell attachments have been suggested for the wheels of automotive passenger vehicles. However, in neither of these prior uses have the bells been particularly decorative, nor has it been possible to quickly remove them from the vehicle when not wanted.

Another object of the invention, therefore, is to provide a vehicle bell attachment which can easily be rendered inoperative or removed from the vehicle altogether.

A further important object of the invention is to provide a vehicle bell attachment that is adapted to be mounted on the body of the vehicle but is constructed and arranged so that it will not impair the vision of the vehicle operator if located in front of him on the hood or a fender.

Still another important object of the invention is to provide a bell attachment of the character described that is attractive in appearance and yet is simple and economical to manufacture.

A more specific object of the invention is to provide a bell attachment of the character described having means incorporated in the attachment structure for producing bell actuating vibrations therein when the vehicle is being driven.

Other objects and advantages of the invention will become apparent from the following detailed description thereof read in conjunction with the accompanying drawings which illustrate representative embodiments of the invention for the purpose of disclosure.

In the drawings:

FIGURE 1 is a diminutive perspective view showing a bell attachment embodying the invention mounted on the fender of an automobile; and FIGURES 2 and 3 are side elevations of typical embodiments of the bell attachment of the invention.

Referring now to the drawings, wherein like reference numbers designate the same part in each of the views, and with particular reference to FIGURE 2, the bell attachment is essentially comprised of an upstanding support indicated generally at 10, means 12 for releasably connecting the support to the vehicle, and a plurality of bells 14 mounted in vertically spaced relation on the support as shown. In the embodiment of FIGURE 2, the support 10 is a resilient bendable rod which is preferably formed of plastic, and the connecting means 12 is conventional suction cup mounted on the lower end of the rod. The bells are graduated in size and are arranged on the support so that they decrease in size from bottom to top thereby giving the attachment a substantially conical or Christmas tree shape.

The top of each bell 14 is fixed to the rod 10 as at 16, and the portion of the rod encompassed by or within each bell is offset as at 18. A small hook or eye 20 is provided at the upper end of each offset, and the clappers 22 for the bells are swingably suspended from these eyes for operation in the usual manner. Since modern automobiles move with very little vibration, a propeller 24 or its equivalent may be rotatably mounted at the upper end of the rod support, the propeller being rotated when the vehicle is in motion and causing sufficient vibration in the flexible rod to actuate the bell clappers.

The suction cup 12 can be mounted on the fender or hood of the vehicle as indicated in FIGURE 1, and even though an adhesive substance is used to increase its holding power, it is still relatively easy to detach the cup whenever necessary or desirable. However, in some instances it may be desired to silence the bells without completely detaching them from the vehicle, and to this end means are provided to hold the support and bells in a doubled-over position as indicated by phantom lines in FIGURE 2 so that the bell clappers will lie against the sides of the bells. This means comprises a hook 26 at the top of the support which is engageable with a hook 28 on the suction cup or base of the rod, the hook 26 also simulating the tassel on the cap of a Santa Claus figurette 30 which may be provided for decorative purposes. In order to have maximum bending of the rod 10 at the portions thereof intermediate the bells, these portions may be formed with reduced cross sectional areas 32 to increase bendability at these points.

FIGURE 3 illustrates an attachment which is similar in arrangement and operation to the modification just described. In the arrangement of FIGURE 3, however, spherical or ball type bells 34 are employed, and the support rod 10' is formed with semi-circular offset portions 36 in which the bells are swingably mounted as by connections 38. The rod 10' can also be maintained in a doubled-over position by means of hooks 26' and 28', and is provided with a vibration producing propeller 24' and figurette 30'.

In the modifications of the bell attachment disclosed herein, the overall height of the attachment need not exceed 12" or more than one-half the height of the vehicle windshield. Accordingly, even if the attachment is mounted on the forward portion of the vehicle, it will not impair the visibility of the operator because it is relatively low and also because none of the modifications offer a solid viewing obstruction. Obviously, the attachment can just as easily be mounted on the roof or trunk portion of the vehicle if such a location is preferred.

From the foregoing description, it will be apparent that the invention disclosed herein provides a novel and very pleasing type of vehicle attachment. As will be understood by those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. A decorative bell attachment for mounting on the body of a vehicle comprising in combination a vertically extending whip-like resilient bendable member, means connected to the lower end of said member for releasably securing it to the vehicle body, a plurality of bells of graduated sizes mounted one above the other in vertically spaced relation on said member, each of said bells having a swingable clapper portion and said bells being of successively larger size from top to bottom of said attachment, said member being formed with an outwardly offset portion adjacent each of said bells for increased freedom of movement of said clapper portions, said member having other portions of reduced cross sectional area between said bells to increase the bendability of the member at said portions, coacting hook means adjacent the top and bottom of said member to hold it in a doubled-over position upon interengagement of said hook means to diminish the operability of said bells, and air driven propeller means rotatably mounted adjacent the upper end of said member for producing vibrations in the member when the vehicle is in motion.

2. A decorative Christmas bell attachment for mounting on a vehicle comprising in combination a vertically extending flexible rod support, means connected to the lower end of said support for detachably securing it to the vehicle, a plurality of bells of graduated sizes mounted one above the other in vertically spaced relation on said support, said bells being successively larger from top to bottom of the attachment for simulating the shape of a Christmas tree and being spaced apart for clear vision therebetween of the operator of the vehicle, means on said support operable to actuate said bells when the vehicle is in motion, and coacting hook means adjacent the top and bottom of said support to maintain the support in a doubled-over position upon interengagement of said hook means to diminish the operability of said bells.

3. Structure as defined in claim 2 together with air rotatable vibration producing means mounted adjacent the upper end of said support.

4. Structure as defined in claim 2 wherein said rod support is formed with an outwardly offset portion adjacent each of said bells for increased freedom of movement of the swinging portion of said bells.

References Cited in the file of this patent

UNITED STATES PATENTS

| | | |
|---|---|---|
| 951,611 | Jakobson | May 8, 1910 |
| 1,853,305 | Frei | Apr. 12, 1932 |

FOREIGN PATENTS

| | | |
|---|---|---|
| 1,105,070 | France | Nov. 28, 1955 |